(No Model.)
J. F. PLATT.
HARROW.
No. 325,694. Patented Sept. 8, 1885.
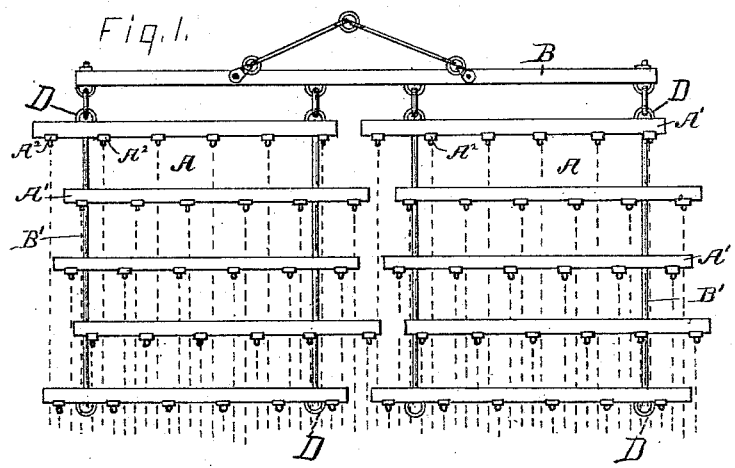
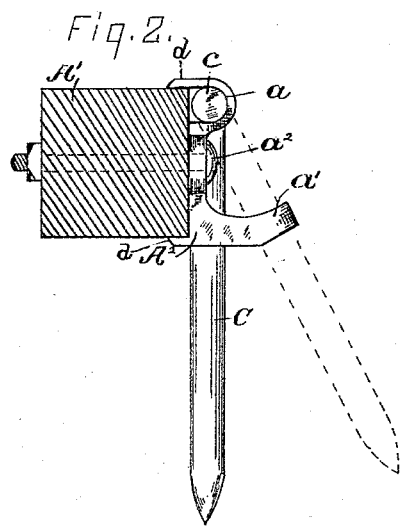
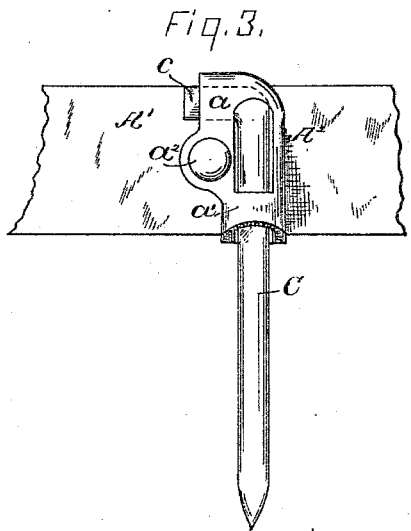
WITNESSES:
H. C. Ward.
Walter N. Haskell.
INVENTOR:
James F. Platt.
By Manahan & Ward
His Attys

UNITED STATES PATENT OFFICE.

JAMES FREDERICK PLATT, OF STERLING, ILLINOIS.

HARROW.

SPECIFICATION forming part of Letters Patent No. 325,694, dated September 8, 1885.

Application filed June 11, 1885. (No model.)

*To all whom it may concern:*

Be it known that I, JAMES FREDERICK PLATT, a citizen of the United States, residing at Sterling, in the county of Whiteside and State of Illinois, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to the class of spike-tooth harrows, and pertains more especially to certain novel improvements by the use of which the harrow can be drawn transversely of its beams, and at the same time be adapted for the twofold use of stirring and smoothing. The advancement in this art has created a demand for harrows in which the teeth are susceptible of assuming both a vertical and an oblique position. The vertical position is adopted when the implement is used for stirring the ground, in which position and for which purpose the teeth enter the earth more deeply and more largely affect the latter. The oblique position is essential when the design is to have the teeth enter the ground to a less depth and perform the function of smoothing the surface. These two functions can be and have been frequently accomplished in one implement by drawing the same from one end or the other, as one or the other result was desired; and the sentiment of economy has necessitated the combination of the two functions named in one implement. This has heretofore been accomplished in two classes of harrows—first, those drawn from the ends of the beams, in which the teeth have been pivoted to oscillate in the line of the beams, and, second, harrows which were drawn transversely of the line of their beams, the latter being adapted to rotate in bearings sufficient to change the inclination or position of the teeth.

In harrows drawn from the corner of the frame the teeth are apt to "track" more or less, from the fact that it is impracticable to place them relatively but that two or more in different parts of the harrow will be in line with each other in the direction of the draft, and on side hills or wet land teeth which are nearly in the same line (reference being had to the direction of movement of the implement) will twist the harrow sufficient to throw more or less of the teeth directly in the track of each other, and thus largely decrease the efficiency of the implement. This evil has been augmented by the more recent system of attaching the harrow in sections to a common draw-bar, which construction has necessitated drawing the sections more nearly in the line of their beams in which the teeth are aligned; and inasmuch as the sectional construction of the harrow permits the raising of the latter in sections for clearing purposes, and thus lessens the labor of operating it, and further renders it practicable to extend the lateral scope of the harrow, and thus enables one man, with the addition of one or more horses, to do the work formerly requiring the employment of two men, such sectional construction has advantages which will cause it to remain popular with farmers.

To avoid the alignment of the teeth referred to and yet retain the sectional feature, harrows have been designed which were adapted to be drawn transversely of the beams, as before suggested; but in order to embody therein the capability of changing the position of the teeth when desired (for the reasons before stated) the beams were arranged to oscillate. This rendered the implement more complicated, and added to its expense.

In my invention I embody in one implement all of the advantages hereinbefore mentioned, and avoid all of the objections named. This I do by placing the beams transversely of the line of movement, and pivoting the teeth in such manner that their oscillation from a vertical to an oblique position, and vice versa, shall be at right angles to the line of the beams.

By reference to the drawings accompanying this specification it will be seen that it is practicable in a harrow drawn directly across the line of its beams to so place the teeth that they shall thoroughly cover the ground, and yet no two of them follow the same track.

In the drawings, Figure 1 is a plan of a harrow embodying my invention. Fig. 2 is a cross-section of the beam and a side elevation of the tooth and the mechanism employed for attaching such tooth to the beam, the oblique position of the tooth being shown in dotted lines. Fig. 3 is a rear elevation exhibiting the relation and mode of attachment of the tooth to the beam.

A A are the sections of the harrow. B is the draw-bar. The sections A are constructed of the beams A', parallel to and at suitable distance from each other. The beams A' are placed also parallel with the draw-bar B, and are rigidly held in fixed relation to each other by means of longitudinal braces B', or in any other suitable manner. The teeth C are attached to the side of the beams A', and, as shown in the drawings, in such mutual relation that no two of such teeth follow the same path in the line of draft, and that when the harrow has passed over the ground each tooth shall have made its own track, and the distance between each of such tracks shall be the same.

$A^2$ is a metal box or clamp constituting the seat of the tooth C, and rigidly attached to the side of the beam A' by means of the nutted bolt $a^2$. The box $A^2$ is provided with flanges $d$, which respectively project slightly over and under the beam A', and assist in holding the box $A^2$ in position. The box $A^2$ is further provided with the horizontal tooth-seat $a$ at its upper end and the rearwardly-extending stay-slot $a'$ at its lower end. The tooth C is provided with the laterally-bent top $c$, adapted to rest in and be supported by the tooth-seat $a$.

D D are staples or hooks placed in pairs at each end of the section A, to afford means of attaching optionally at either end of such sections. It is obvious that when such sections are drawn with the beams A' in front of the teeth C the latter will swing to the rear end of the stay-slot $a'$ and assume the oblique position shown in dotted lines in Fig. 2, and the implement thereby become a smoothing-harrow, and if the harrow be drawn from the opposite end the teeth will assume the vertical position and the implement become a stirring-harrow. The bolt $a^2$ is placed about midway of the two bearing-surfaces of the tooth C in each working position of the latter, so as to be equally efficient in each operation of the implement.

I am aware that metallic boxes have been used heretofore as a seat for pendent harrow-teeth; but none of such devices were intended to swing the tooth at right angles to the tooth-beam. Some of such devices were designed to be placed under the beam, where they would impede the passage under the harrow of loose material, and in none of the devices heretofore used or shown was the tooth, when in a vertical working position, strengthened and supported by lying against the beam, as in my invention, in which the obstacles in the ground have but slight leverage upon the pivotal part of the tooth.

What I claim as my invention, and desire to secure by Letters Patent of the United States, is—

1. In combination with the beam A', placed at right angles to the line of draft, the box $A^2$, seated against the side of said beam, and the tooth C, pivoted near the top of the beam, so as to swing in the line of draft and at right angles to said beam, and such tooth, when in a vertical position, being supported against pressure by said beam, substantially as shown, and for the purpose specified.

2. In a harrow, the beam A', located at right angles to the line of draft, the box $A^2$, provided with the tooth-seat $a$ and stay-slot $a'$, and attached to the beam A' with the slot $a'$ at right angles to the beam, and the tooth C, pivoted in said box and adapted to swing automatically in the slot and at right angles to the beam, substantially as shown, and for the purpose described.

In testimony whereof I affix my signature in presence of two witnesses.

JAMES FREDERICK PLATT.

Witnesses:
 WALTER N. HASKELL,
 JAMES F. CRISWELL.